US012049858B1

(12) United States Patent
Svensson et al.

(10) Patent No.: US 12,049,858 B1
(45) Date of Patent: Jul. 30, 2024

(54) FUEL SYSTEM HAVING FUEL INJECTOR BOOT ASSEMBLY CONFIGURED WITH GRASPING PROTRUSION

(71) Applicant: Caterpillar Inc., Peoria, IL (US)

(72) Inventors: Kenth I. Svensson, Peoria, IL (US); William Barnes, Rapid City, SD (US); Eric D. Wiebrecht, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/116,399

(22) Filed: Mar. 2, 2023

(51) Int. Cl.

| | |
|---|---|
| ***F02M 55/00*** | (2006.01) |
| ***F02M 51/00*** | (2006.01) |
| ***F02M 61/14*** | (2006.01) |

(52) U.S. Cl.
CPC ........ *F02M 55/004* (2013.01); *F02M 51/005* (2013.01); *F02M 61/14* (2013.01); *F02M 2200/858* (2013.01)

(58) Field of Classification Search
CPC .... F02M 55/004; F02M 51/005; F02M 61/14; F02M 2200/858
See application file for complete search history.

(56) References Cited

U.S. PATENT DOCUMENTS

| | | | | |
|---|---|---|---|---|
| 5,494,224 | A | 2/1996 | Hall et al. | |
| 6,257,509 | B1 | 7/2001 | Hafner et al. | |
| 7,115,036 | B2 * | 10/2006 | Masuda | F16D 3/227 464/17 |
| 7,909,635 | B2 | 3/2011 | Hughes | |
| 10,808,662 | B2 | 10/2020 | Yamamoto et al. | |
| 2020/0232435 | A1 * | 7/2020 | Hinten | F02M 61/168 |

FOREIGN PATENT DOCUMENTS

| | | | |
|---|---|---|---|
| EP | 2863485 | B1 | 2/2018 |
| KR | 100803723 | B1 | 2/2008 |

OTHER PUBLICATIONS

U.S. Appl. No. 17/895,564, filed Aug. 25, 2022, to Wiebrech.

* cited by examiner

*Primary Examiner* — Xiao En Mo
(74) *Attorney, Agent, or Firm* — Brannon Sowers & Cracraft PC

(57) ABSTRACT

A boot in a fuel system includes an injector portion receiving a fuel injector, and a conduit portion receiving a double-walled fuel conduit. The injector portion includes a window therein receiving an electrical connector of the fuel injector. The conduit portion includes a radially outward grasping protrusion for installing the conduit portion over the electrical connector.

20 Claims, 2 Drawing Sheets

FUEL SYSTEM HAVING FUEL INJECTOR BOOT ASSEMBLY CONFIGURED WITH GRASPING PROTRUSION

TECHNICAL FIELD

The present disclosure relates generally to a boot in a fuel system, and more particularly to a boot having a grasping protrusion.

BACKGROUND

The fuel system in a modern internal combustion engine is often the most complex and expensive part of the equipment. Fuel is typically pressurized to a range of pressures depending upon application and injection location, and delivered for combustion in one or more shots of fuel into a cylinder by way of precisely controlling electrically and/or hydraulically actuated components in fuel injectors. Pressurized fuel systems can require specialized sealing and fuel containment apparatus. For regulatory and other purposes higher pressure portions of a fuel system often employ double-walled containment, such that in the event of a liquid fuel and/or fuel vapor leak fuel is contained in a secondary system outside of the highly pressurized portions and can be returned to a fuel tank or otherwise safely handled.

A component known as a boot is sometimes used in pressurized fuel systems and can assist in positioning and/or protecting certain components, including fuel injectors and fuel connections. An example boot employed in a fuel system is known from co-pending application Ser. No. 17/895,564, filed Aug. 25, 2022, to Wiebrecht. While the designs proposed in Wiebrecht offer promise, there is always room for improvement and development of alternative strategies.

SUMMARY OF THE INVENTION

In one aspect, a fuel system includes a fuel injector including an injector housing having a fuel inlet and a fuel outlet formed therein, and an electrical connector projecting from the injector housing. The fuel system further includes a double-walled fuel conduit connected to the fuel injector, and a boot. The boot includes an elongate boot body defining a longitudinal axis and having an injector portion receiving the fuel injector, and a conduit portion receiving the fuel conduit. The injector portion has a window formed at least partially therein receiving the electrical connector, and the conduit portion includes a radially outward grasping protrusion.

In another aspect, a boot assembly for a fluid system includes a fuel injector including an injector housing having a fuel inlet and a fuel outlet formed therein, and an electrical connector projecting from the injector housing. The boot assembly further includes a boot defining a longitudinal axis and having an injector portion receiving the fuel injector, and a conduit portion structured for receiving a fuel conduit. The injector portion includes a window formed at least partially therein receiving the electrical connector, and the conduit portion includes a radially outward grasping protrusion.

In still another aspect, a boot for a fuel injector and fuel conduit assembly includes an elongate boot body defining a longitudinal axis extending between an injector portion forming an open first axial end, and a conduit portion forming an open second axial end, the injector portion having a window formed at least partially therein between an inner boot surface forming a central cavity and an outer boot surface. The conduit portion includes a radially inward protrusion extending circumferentially around the longitudinal axis and spaced axially inward from the open second axial end, and a grasping protrusion projecting radially outward of the outer boot surface.

DETAILED DESCRIPTION

Figure 1:
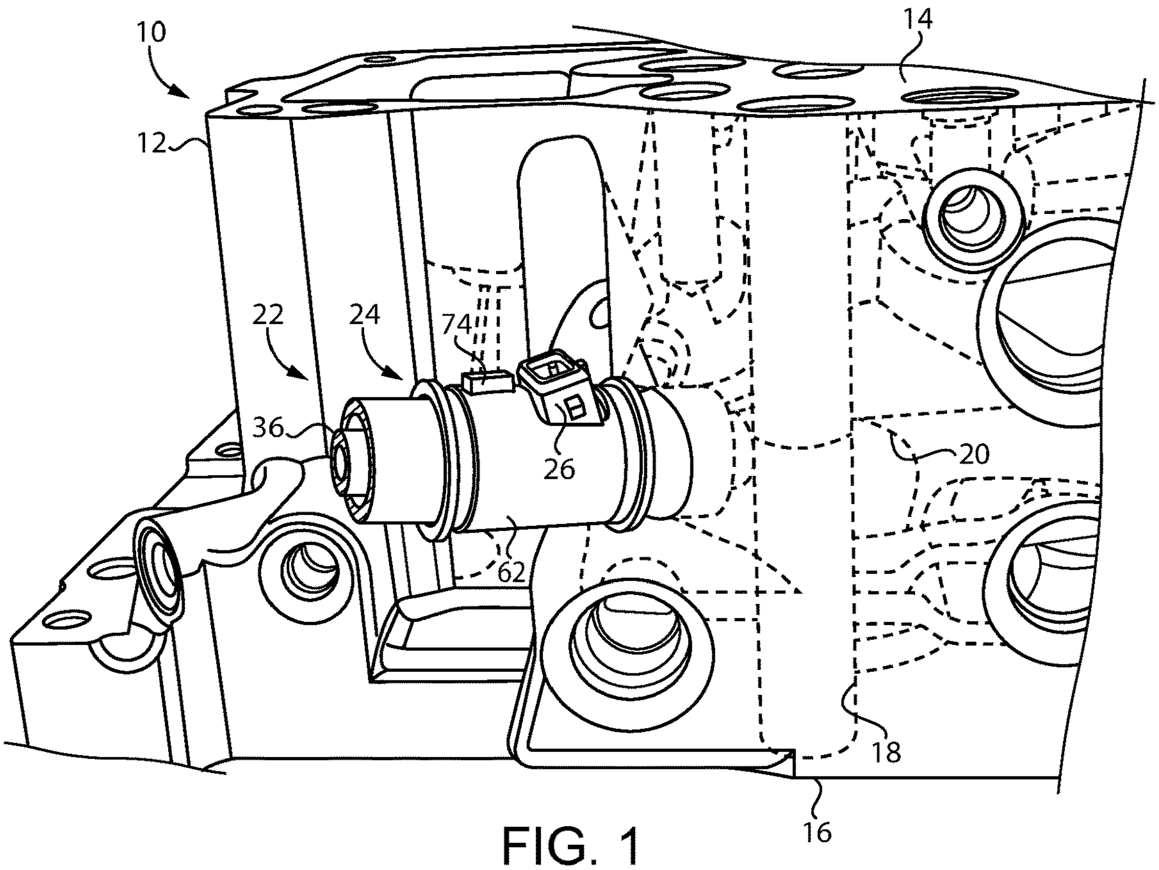
FIG. 1 is a diagrammatic view of an engine system, according to one embodiment.

Referring to FIG. 1, there is shown an internal combustion engine system 10, according to one embodiment. Engine system 10 includes a cylinder head 12 having an upper cylinder head surface 14, a lower cylinder head surface 16, and bolt bores 18 for extending between upper cylinder head surface 14 and lower cylinder head surface 16. Other typical features for transfer of fluids including engine coolant and/or oil may extend through cylinder head 12. Cylinder head 12 may be a cylinder head section associated with one combustion cylinder in a cylinder block, or a slab cylinder head associated with multiple combustion cylinders. Engine system 10 may be implemented in a variety of applications, including for electrical power generation, for propelling a land vehicle or a marine vessel, or operating a pump or compressor to name a few examples. Engine system 10 may include any number of combustion cylinders in any suitable arrangement, such as an inline pattern, a V-pattern, or still another. Engine system 10 may be operated on a liquid primary fuel, and dual-fuel pilot ignited using a compression-ignition liquid fuel, although the present disclosure is not thereby limited. A spark-ignited strategy is also within the scope of the present disclosure. An example liquid primary fuel includes methanol, although the present disclosure is also not thereby limited in this regard.

Cylinder head 12 further includes one or more intake ports 20 formed therein. In a practical implementation engine system 10 is port-injected with liquid methanol fuel. The methanol fuel may be ignited by way of a compression-ignited direct injection of a diesel distillate fuel or ignited via dimethyl ether, for example. As will be further apparent from the following description engine system 10 is uniquely configured by way of fuel system apparatus for containment of liquid fuel and fuel vapors as well as ventilation of fuel supply and containment apparatus. While aspects of the present disclosure are described in the context of a fuel system, in other instances teachings herein could be applied in a different type of fluid system, such as system supplying and delivering oil in an engine or other machinery context, or still other environments.

Figure 2:
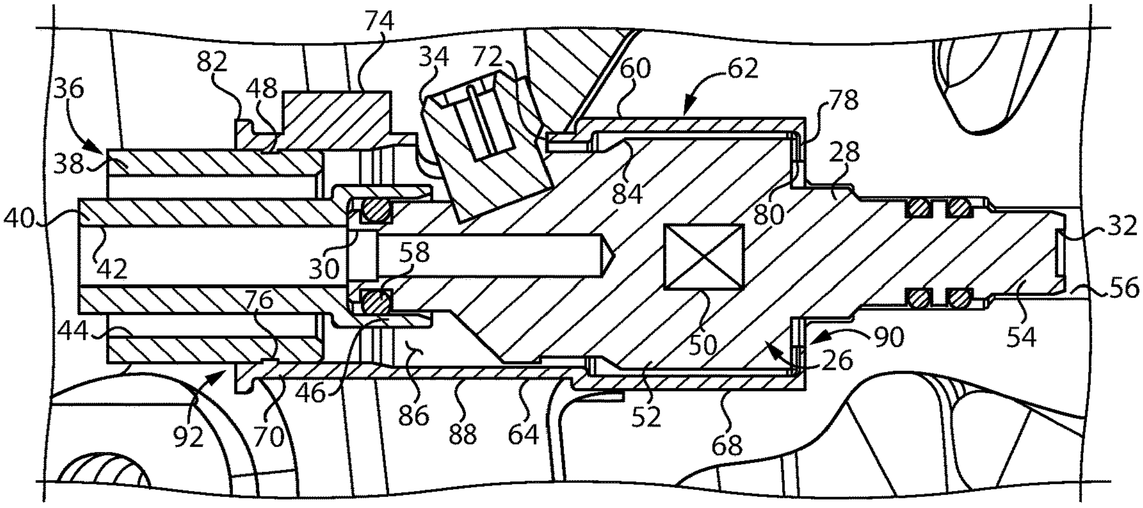
FIG. 2 is a sectioned side diagrammatic view of a portion of the engine system as in FIG. 1.

To this end, engine system 10 further includes a fuel system 22. Fuel system 22 includes a fuel injector and conduit assembly 24. Referring also now to FIG. 2, assembly 24 includes a fuel injector 26, and fuel injector 26 includes an injector housing 28 having a fuel inlet 30 and a fuel outlet 32 formed therein, and an electrical connector 34 projecting from injector housing 28. Fuel injector 26 also includes an electrically actuated valve assembly 50. Fuel injector 26 may be a fuel injector of known design having a known configuration and operation of valve assembly 50 to inject a fuel, such as methanol, from fuel outlet 32 into a fuel port 56 in cylinder head 12 that fluidly connects to intake port 20. An example fuel injector construction is set forth in co-pending application Ser. No. 17/895,564, referenced above.

Fuel system 22 and assembly 24 further include a fuel conduit 36 connected to fuel injector 26. Fuel conduit 36 may include a double-walled fuel conduit having an outer wall 38 and an inner wall 40 defining a fuel supply passage 42 fluidly connected to fuel inlet 30, and also to a fuel pressurization pump and a liquid fuel supply such as a methanol fuel tank (not shown). An interwall space 44 typically having the form of an annulus is defined between outer wall 38 and inner wall 40. In a practical implementation strategy, a vacuum is drawn on interwall space 44 such that a negative pressure is continuously applied. In the event of fuel leakage the negative pressure can assist in ensuring that any leaked liquid fuel and/or vapors can be returned to a fuel tank, for example, or safely discharged to ambient. Inner wall 40 may further include an injector fitting 46 coupled to and in contact with a body portion 52 of fuel injector 26. A tip portion 54 of fuel injector 26 projects into fuel port 56. An O-ring 58 may be provided to seal between injector fitting 46 and body portion 52.

Referring also now to FIG. 2, fuel system 22 further includes a boot 60 forming, together with fuel injector 26, a boot assembly 62. Boot 60 includes an elongate boot body 64 defining a longitudinal axis 66 and having an injector portion 68 receiving fuel injector 26, and a conduit portion 70 receiving fuel conduit 36. Injector portion 68 further includes a window 72 formed at least partially therein and receiving electrical connector 34. Conduit portion 70 further includes a radially outward grasping protrusion 74 for installing boot 60 over fuel injector 26 and/or for installing conduit portion 70 over double-walled fuel conduit 36.

As can further be seen from FIG. 2, conduit portion 70 includes a radially inward protrusion or tab 76 fitted within a groove 48 formed in fuel conduit 36. Injector portion 68 includes an end wall 78 extending radially inward and forming an opening 80. Fuel injector 26 is in contact against end wall 78 and extends through opening 80. It can further be noted conduit portion 70 includes an end flange 82 extending circumferentially around longitudinal axis 66. Grasping protrusion 74 may be axially spaced from window 72 and in circumferential alignment with window 72 about longitudinal axis 66. Also in the illustrated embodiment grasping protrusion 74 is located axially between end flange 82 and window 72.

Figure 3:
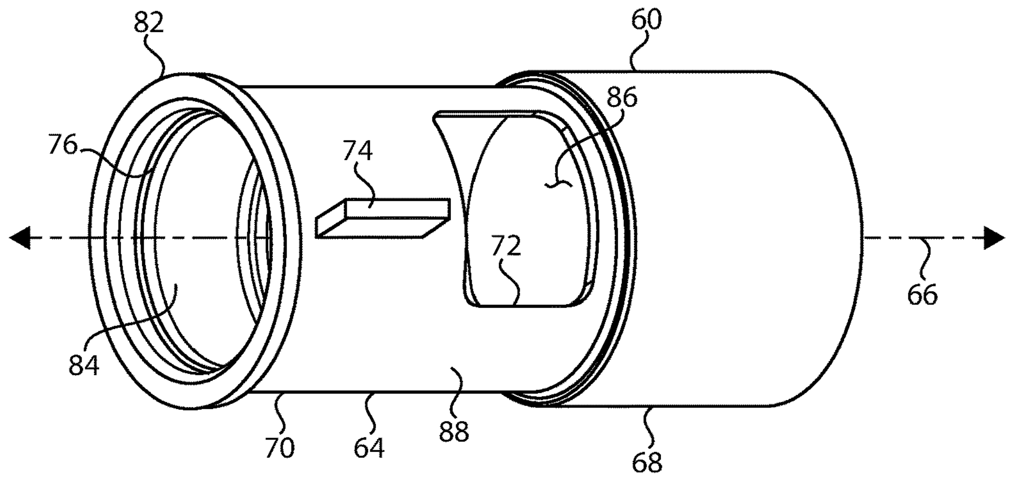
FIG. 3 is a diagrammatic view of a boot, according to one embodiment.

Referring also now to FIG. 3, injector portion 68 may form an open first axial end 90, and conduit portion 70 may form an open second axial end 92. Window 72 may be formed between an inner boot surface 84 forming a central cavity 86 and an outer boot surface 88. Elongate boot body 64, referred to, at times, herein interchangeably with boot 60, may be formed of a deformable non-metallic material such as a natural rubber, or another suitable natural or synthetic rubber-like material including any of a variety of different polymeric materials readily commercially available. Fuel conduit 36 may be formed of a metallic material that is not deformable relative to the material forming boot 60. Grasping protrusion 74 may be formed integrally with boot body 64. Embodiments where a grasping protrusion is a separate piece attached to boot body 64 are nevertheless within the scope of the present disclosure. Boot body 64 also includes an outer surface 88, and outer surface 88 may extend fully peripherally around grasping protrusion 74.

Figure 4:
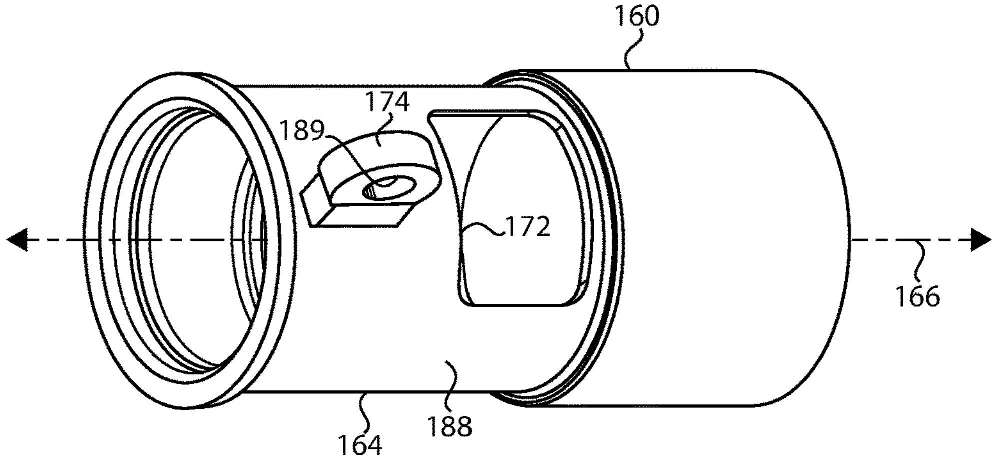
FIG. 4 is a diagrammatic view of a boot, according to another embodiment.

Referring now to FIG. 4, there is shown a boot 160 having certain similarities with boot 60 discussed above, but certain differences. Boot 160 includes an elongate boot body 164 defining a longitudinal axis 166 and having a window 172 formed therein. Boot 160 also includes a radially outward grasping protrusion 174 for installing boot 160, including a conduit portion thereof, over a double-walled fuel conduit. Grasping protrusion 174 further includes one or more engagement surface(s) 189 oriented obliquely to an outer surface 188 of boot body 164. Engagement surface(s) 189 form the inner surface of a loop or loop-like structure that stands proud of an outer surface of boot 160 to receive a user's finger or a tool. An engagement surface that is oriented obliquely to a given surface as described herein means an engagement surface that is other than perpendicular or parallel to that given surface. It will be appreciated grasping protrusion 174 has the form of an eye in the illustrated embodiment.

Figure 5:
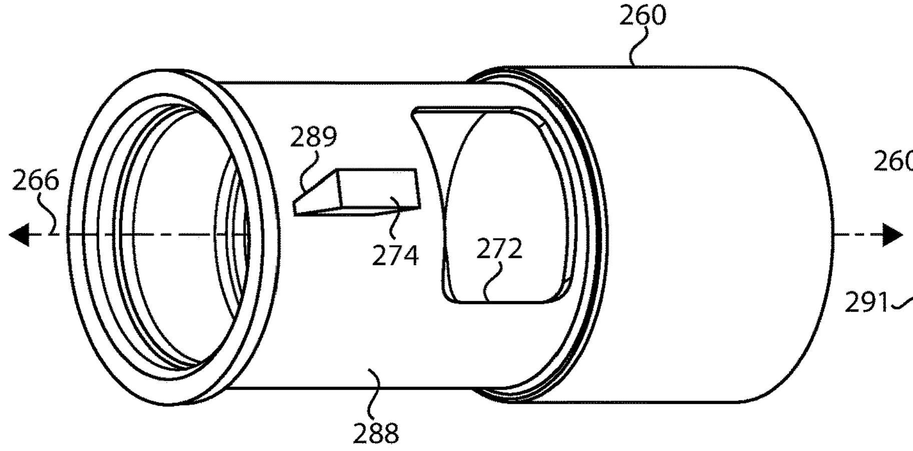
FIG. 5 is a diagrammatic view of a boot, according to yet another embodiment.

Turning now to FIG. 5 there is shown another embodiment of a boot 260 having similarities with forgoing embodiments but also certain differences. Boot 260 has a window 272 formed therein, and defines a longitudinal axis 266. Boot 260 also includes a grasping protrusion 274. Grasping protrusion 274 includes one or more engagement surface(s) 289 oriented obliquely to an outer surface 288 of boot 260. In the illustrated embodiment, two engagement surfaces 289 extend longitudinally along grasping protrusion 274 and, in an axial projection plane, would be understood to form acute angles with a line tangent to a circle defined by outer boot surface 288 and centered on longitudinal axis 266. Other engagement surface configurations are within the scope of the present disclosure, including angled axial end surfaces of a grasping protrusion, for example. It can be appreciated that grasping protrusion 274 has the form of a wedge. The shape of grasping protrusion 274 enables a user to grip their fingers, or a tool, against surface(s) 289 to pull away and/or along longitudinal axis 266 to deform boot 260 over an electrical connector of a fuel injector or other apparatus as described herein. Although embodiments are contemplated where a grasping protrusion forms one of an eye or a wedge, or a tab, the present disclosure is not thereby limited. In the embodiment of FIG. 3 grasping protrusion 74 is neither an eye nor a wedge but instead understood as a protruding wall or tab. Still other embodiments could employ a hook, an eye rotated approximately 90° in comparison to the embodiment of FIG. 4, or still other configurations and/or combinations.

Figure 6:
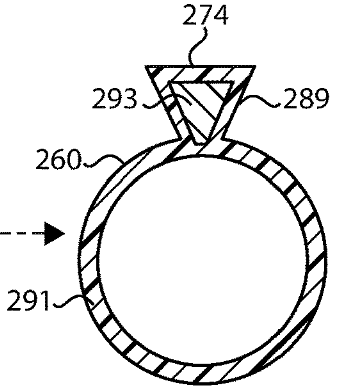
FIG. 6 is a sectioned view of a boot as in FIG. 5.

Focusing now on FIG. 6, it will be recalled a boot according to the present disclosure may include a deformable non-metallic material. A boot according to the present disclosure may be formed by way of injection molding, for example. In FIG. 6 the deformable, non-metallic material is denoted with reference numeral 291. Grasping protrusion 274 may include an integrally molded second material 293, imparting additional structural integrity, including strength and/or elasticity, to grasping protrusion 274. An example material includes a textile fibrous material, a solid metallic or metallic mesh material, or an embedded non-metallic material having desirable strength or elasticity properties different from material 291. Other embodiments contemplated herein may have a similar construction. Moreover, any discussion or description herein of any one embodiment should be understood to refer to any other embodiment except where otherwise indicated or apparent from the context.

INDUSTRIAL APPLICABILITY

Referring to the drawings generally, but returning focus to the embodiment of FIGS. 2 and 3, when a fuel injector is to be coupled to a cylinder head for service, boot 60 may first be installed over fuel injector 26, and then the boot assembly 62 of fuel injector 26 and boot 60 coupled to fuel conduit 36. It may be desirable or necessary to deform and stretch boot 60 when window 72 is to be positioned over and around electrical connector 34. A user can utilize grasping protrusion 74 to stretch boot 60 over electrical connector 34 to position electrical connector 34 within window 72 as desired. Grasping protrusion 74 might also be employed to stretch boot 60 over fuel conduit 36, enabling a user to stretch boot 60 to engage annular protrusion 76 in groove 48 and complete assembly.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel system comprising:

a fuel injector including an injector housing having a fuel inlet and a fuel outlet formed therein, and an electrical connector projecting from the injector housing;

a double-walled fuel conduit connected to the fuel injector;

the boot including an elongate boot body defining a longitudinal axis and having an injector portion receiving the fuel injector, and a conduit portion receiving the fuel conduit;

the injector portion having a window formed at least partially therein receiving the electrical connector; and the conduit portion including a radially outward grasping protrusion.

2. The fuel system of claim 1 wherein the conduit portion includes a radially inward protrusion fitted within a groove formed in the fuel conduit.

3. The fuel system of claim 2 wherein the injector portion includes an end wall extending radially inward and forming an opening, and the fuel injector is in contact against the end wall and extends through the opening.

4. The fuel system of claim 1 wherein the grasping protrusion is axially spaced from the window and in circumferential alignment with the window about the longitudinal axis.

5. The fuel system of claim 4 wherein the conduit portion includes an end flange extending circumferentially around the longitudinal axis, and the grasping protrusion is located axially between the end flange and the window.

6. The fuel system of claim 1 wherein the elongate boot body is formed of a deformable non-metallic material, and the fuel conduit is formed of a metallic material.

7. The fuel system of claim 6 wherein the grasping protrusion is formed integrally with the elongate boot body.

8. The fuel system of claim 1 wherein the elongate boot body includes an outer surface extending fully peripherally around the grasping protrusion, and the grasping protrusion includes an engagement surface oriented obliquely to the outer surface.

9. A cylinder head assembly including the fuel system of claim 1 and having a cylinder head including an intake port positioned to receive an injection of fuel from the fuel injector.

10. A boot assembly for a fuel system comprising:

a fuel injector including an injector housing having a fuel inlet and a fuel outlet formed therein, and an electrical connector projecting from the injector housing;

a boot defining a longitudinal axis and having an injector portion receiving the fuel injector, and a conduit portion structured for receiving a fuel conduit;

the injector portion having a window formed at least partially therein receiving the electrical connector; and the conduit portion including a radially outward grasping protrusion.

11. The boot assembly of claim 10 wherein the conduit portion includes a radially inward protrusion and a radially outward end flange.

12. The boot assembly of claim 11 wherein the injector portion includes an end wall extending radially inward and forming an opening, and the fuel injector is in contact against the end wall and extends through the opening.

13. The boot assembly of claim 10 wherein the grasping protrusion is axially spaced from the window and in circumferential alignment with the window about the longitudinal axis.

14. The boot assembly of claim 10 wherein the elongate boot body is formed of a deformable non-metallic material, and the grasping protrusion is formed integrally with the elongate boot body.

15. The boot assembly of claim 14 wherein the elongate boot body includes an outer surface extending fully peripherally around the grasping protrusion, and the grasping protrusion includes an engagement surface oriented obliquely to the outer surface.

16. The boot assembly of claim 10 wherein the grasping protrusion forms one of an eye, a tab, or a wedge.

17. A boot for a fuel injector and fuel conduit assembly comprising:

an elongate boot body defining a longitudinal axis extending between an injector portion forming an open first axial end, and a conduit portion forming an open second axial end, and the injector portion having a window formed at least partially therein between an inner boot surface forming a central cavity and an outer boot surface; and the conduit portion including a radially inward protrusion extending circumferentially around the longitudinal axis and spaced axially inward from the open second axial end, and a grasping protrusion projecting radially outward of the outer boot surface, for installing the conduit portion over a fuel conduit.

18. The boot of claim 17 wherein the outer boot surface extends fully peripherally around the grasping protrusion, and the grasping protrusion includes an engagement surface oriented obliquely to the outer surface.

19. The boot of claim 18 wherein the grasping protrusion includes an eye.

20. The boot of claim 18 wherein the grasping protrusion includes a wedge.

* * * * *